Aug. 9, 1955 M. H. HAYES 2,715,208
POTENTIOMETER LINEARITY TESTER
Filed Feb. 2, 1954 2 Sheets-Sheet 2

ǂ

2,715,208

POTENTIOMETER LINEARITY TESTER

Monson H. Hayes, Binghamton, N. Y., assignor to Link Aviation, Inc., Binghamton, N. Y., a corporation of New York Application February 2, 1954, Serial No. 407,683

12 Claims. (Cl. 324—63)

My invention relates to a method and apparatus for testing the linearity of variable electrical potential dividers, and more particularly to an improved method and means for comparing a potential divider of unknown linearity with the linear resistance characteristics of a known standard potential divider of preselected characteristics.

In the electronic arts generally, and especially in the automatic control, analogue computer and electrical instrumentation arts, potentiometers are extensively employed to derive voltages varying as a function of a rotating mechanical shaft input. For such purposes, as well as in many other applications including the selection of controls for radio and television systems, it is very important that variations in electrical resistance throughout the length of the potentiometer resistive element conform within prescribed tolerances to a predetermined curve or function. The precision requirements of modern electronics prescribe very close tolerances for such devices in some applications, and permit greater deviations in other applications. With the increasing demand for greater quantities of precision potentiometers, manufacturers who make or use large numbers of such devices have had no convenient method or means for rapidly and accurately testing potentiometer linearity characteristics to the required degree of precision.

It is therefore one of the objects of my invention to provide a method of rapidly and accurately determining the linear resistive characteristics of electrical potential dividers such as potentiometers.

Another object of my invention is to provide improved means for comparing the linear resistance characteristics of potential dividers such as potentiometers under test with the characteristics of a preselected standard unit and for indicating any and all deviations from said standard characteristics.

Another object is to provide potential divider testing means adjustable to permit any predetermined tolerance of linearity deviations between a standard and a potential divider under test, and to reject any potential divider the linearity of which fails to come within the preselected tolerance limits of permissible deviations.

Still another object of my invention is to provide means for comparing the total angular electrical path of a test potentiometer with a standard, and for indicating deviations therefrom.

An additional object of my invention is to provide in a potentiometer tester means for graphically recording all characteristic deviations of a test potentiometer from a predetermined standard.

Other objects of the invention will in part be obvious and will in part appear hereinafter.

In general, the objects of the invention are attained by employing a selected potential divider or potentiometer of good quality and desired linear characteristics as a standard against which the potential divider or potentiometer to be tested is compared. The two potential dividers are mounted in the test apparatus and their movable or wiper contacts are coupled, through suitable means, to a common drive means or motor.

It is not necessary that the total resistance of the standard equal the overall resistance of the test potentiometer, nor is it necessary that both standard and test potentiometer be designed to operate through the same total wiper or angular displacement. Differences in resistance and in wiper movement or angular shaft rotation may be compensated for by the selection of suitable shunt resistors and connecting gear ratios.

Starting with the wipers of the standard and test potential dividers in the same relative positions contacting corresponding ends of their respective resistance elements, a common source of potential is connected across the resistance elements of both potential dividers. As the driving means or motor is started and the drive advances the wipers over their respective resistance elements, any difference in linearity between the test potential divider or potentiometer and the standard will result in a potential difference between the two wipers. A voltmeter connected between the two wiper contacts provides a continuous visual indication of any such linear deviation, while a graphic recorder plots the deviation as a continuous curve.

A feature of the invention is the provision of means for setting into the test circuit any selected range of tolerance, whereby tested potential dividers or potentiometers whose characteristics are within the selected tolerance range are acceptable, whereas any deviation beyond the selected tolerance range will interrupt the operation of the driving means or motor and operate a reject signal. The graphic recorder, meanwhile, provides a permanent record of the nature and extent of the deviation from the standard norm.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 2:
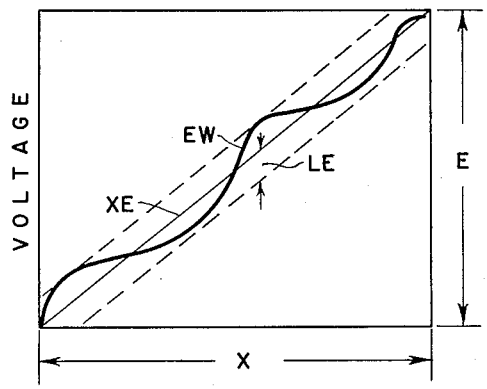
Fig. 2 represents a graphic plot of potentiometer wiper travel versus voltage, showing a range of permissible deviations from a predetermined linear standard.

Referring first in greater detail to Fig. 2 of the darwings, I shall define the terms "linearity" and "tolerance" as used herein. In Fig. 2, the ordinate E represents a voltage applied across a potentiometer, and the abbcissa X represents the position of the potentiometer wiper arm expressed as a percentage of the total electrical travel of the wiper over the potentiometer resistance element. The line XE which passes through zero and 100% electrical travel, and through zero and 100% voltage, represents the ideal of linearity, i. e., zero deviation from the standard. This is sometimes referred to as "zero based linearity." $E_w$ represents the voltage between the wiper arm of a test potentiometer and the starting point or zero electrical end of the resistance element. Thus linearity tolerance, represented by the extremes of the two dotted lines in Fig. 2, is maximum value of $$\frac{(E_w - XE)}{E}$$

If L represents the linearity tolerance limit, the value $(E_w - XE)$ is always less than LE, as shown in Fig. 2.

Figure 3:
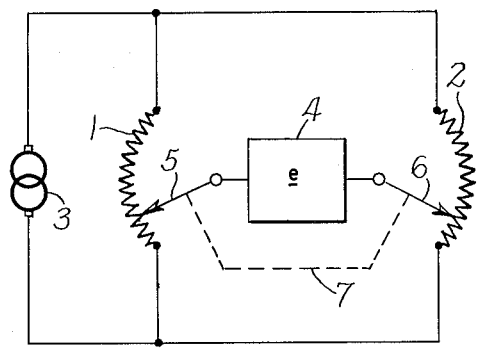
Fig. 3 represents a simplified schematic diagram of a bridge circuit which may be employed for a limited test of potentiometer linearity.

Referring now to Fig. 3, it will be seen that in this basic circuit, the test potentiometer 1 and a standard potentiometer 2 of known accurate linearity are both excited by the same voltage E from the source 3. Connected between the wiper arms 5 and 6 of potentiometers 1 and 2 respectively is an error meter 4 which will indicate the difference in potential $e$ between the wiper arms of the two potentiometers. If the wiper arms of the potentiometers 1 and 2 are both set at zero electrical rotation and are mechanically coupled to a common drive shaft 7, as indicated by dotted lines in Fig. 3, both wiper arms 5 and 6 may be simultaneously moved to corresponding positions along their respective potentiometer resistance elements. The error voltage $e$ between the wipres 5 and 6, which appears on meter 4, is then an indication of the difference in linearity between the standard and test potentiometers. Assuming no error in the meter 4, the linearity deviation $k$ of the test potentiometer 1 with respect to the standard 2 is $$k = \frac{e}{E}$$

Thus, in Fig. 3, as the wiper arms 5 and 6 are moved from one end to their potentiometer resistance elements to the other through rotation of shaft 7, a continuous indication of the linearity of test potentiometer 1 as compared with the standard 2 may be observed on the meter 4. It is significant to note in this circuit that the linearity as indicated is the ratio of $$\frac{e}{E}$$

and so if the full scale of meter 4 is proportional to E, the linearity deviation may be measured independently of the actual magnitude of E.

Figure 4:
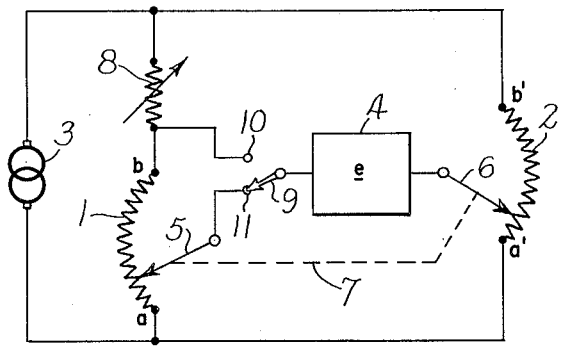
Fig. 4 represents a modification of the bridge circuit of Fig. 3 which is necessary for determining the angular electrical path of a test potentiometer.
Figure 5:
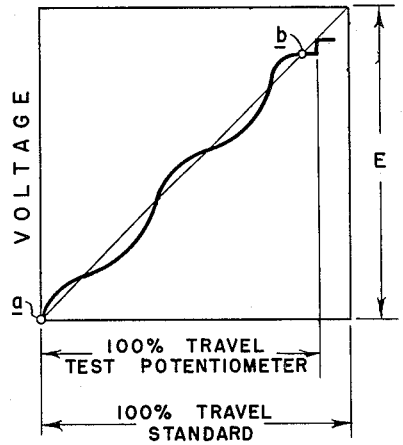
Fig. 5 represents a graphic plot of potentiometer wiper travel versus voltage, illustrating the manner in which the electrical length of a test potentiometer may be compared with a standard.

Referring now to Fig. 4 of the drawings, it will be seen that in order to determine accurately the total electrical rotation of the test potentiometer it is necessary to insert an additional resistor 8 in series with the test potentiometer 1. In this circuit, the electrical travel of the wiper 5 of the test potentiometer 1 corresponding to the total electrical travel of wiper 6 over the standard potentiometer 2 represents slightly less than the total mechanical travel of the wiper 6 over the resistance element 2. For greatest accuracy in determining this characteristic, the resistor 8 is preferably variable and is adjusted to a very low value. As the potentiometer wiper 5 advances from $a$ to $b$ and traverses the last increment of the test potentiometer resistance 1, a sudden change in error voltage $e$ on meter 4 indicates 100% electrical travel of the test potentiometer, as represented by Fig. 5, hereafter. By means of a calibrated dial on the test potentiometer shaft, or on the coupled drive shaft 7, the angle of electrical rotation may be read at this point in the testing procedure.

Referring now to Fig. 5 of the drawings, the method of measuring the total electrical rotation of a potentiometer under test may be better understood from a step by step analysis of the test procedure to be followed. The wipers of the test potentiometer and the standard potentiometer are both coupled together and both adjusted to zero displacement (i. e., to the lower ends $a$ and $a'$ of the respective potentiometer resistance elements in Fig. 4) at which position the voltage on each wiper will be zero and the difference in voltage between wipers will likewise be zero. This start position is represented by the point $a$ in Fig. 5 of the drawing. Next the coupled wipers are advanced toward the opposite ends $b$ and $b'$ of their respective potentiometer resistance elements, but are stopped a very short distance before reaching the extreme opposite ends, $b$ and $b'$ of potentiometers 1 and 2 in Fig. 4. Preferably the wipers 5 and 6 should be advanced as close to the upper ends $b$ and $b'$ of the potentiometer resistance elements 1 and 2 as possible without actually engaging the ends. In the case of wire wound potentiometers the wipers may be advanced to within one or two turns of the upper end.

At this position, the meter 4 is disconnected from the wiper 5 and is connected to the juncture between resistor 8 and potentiometer 1 (Fig. 4) by means of the single pole double throw switch 9 which is moved from contact 11 to contact 10. Variable resistor 8 is now adjusted to produce a zero indication on meter 4. This establishes the upper calibration point $b$ in Fig. 5. Now the switch 9 may be returned to contact 11, again connecting the wiper 5 to the meter 4, and the two wiper shafts are simultaneously returned to their zero positions, with wipers 5 and 6 (Fig. 4) in contact with the lower ends $a$ and $a'$ of resistance elements 1 and 2, respectively. A dial (not shown) coupled to the shaft of potentiometer wiper 5, or to the connected drive shaft 7, and adapted to indicate degrees of angular rotation, is now set at zero degrees. The linearity test may now proceed by the uniform movement of wipers 5 and 6 between $a$—$b$ and $a'$—$b'$ (Fig. 4) over their respective potentiometers, and deviations in the linearity of the test potentiometer 1 from the standard potentiometer 2 may be observed on meter 4 at every position to which the wipers 5 and 6 are advanced. When the wiper 5 reaches the upper end $b$ of test potentiometer 1, having traversed 100% of the electrical resistance path therein, a sudden and very pronounced increase in error voltage will appear on meter 4 to indicate the arrival of wiper 5 at this position, and the total angle of rotation may be read from the calibrated dial coupled to the potentiometer shaft.

Figure 6:
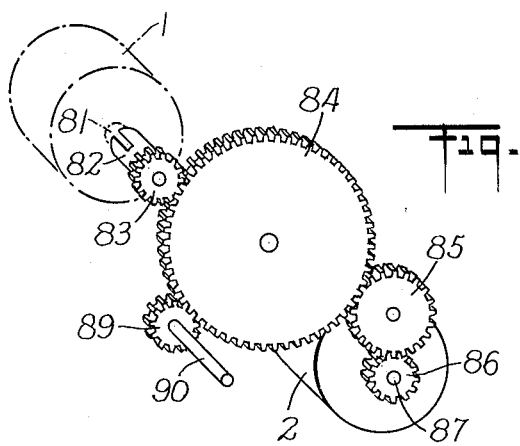
Fig. 6 illustrates one form of coupling means, comprising a chuck and gear train, which may be employed for connecting the shaft of a test potentiometer to the shaft of a standard potentiometer.

Reference is now had to Fig. 6 of the drawings wherein is disclosed one form of structure by which the shaft of a potentiometer to be tested may be coupled to the shaft of a standard potentiometer. In Fig. 6 the shaft 81 of the test potentiometer 1, shown in broken lines, is inserted in a spring type chuck 82 having affixed to its opposite end a spur gear 83 which engages driven gear 84. An idler gear 85 transmits motion from driven gear 84 to gear 86 which is coupled to the shaft 87 of the standard potentiometer 2. Gear 84 is driven by pinion 89 through rotation of shaft 90 which is coupled to a suitable motor (represented schematically by 16 in Fig. 1). The ratios of the several gears are so selected that full rotation of the test potentiometer shaft 81, through whatever angle the test potentiometer may be designed to operate, substantially corresponds to full shaft rotation of the standard potentiometer 2. If the standard and test potentiometers should be identical types, then the shaft coupling ratio should be approximately 1:1. However, I generally prefer to employ as the standard a helically wound potentiometer the shaft of which is adapted to be rotated through fifteen revolutions in moving the wiper arm from one end of the resistance element to the other. When potentiometers to be tested against this standard are of types adapted to operate in less than fifteen revolutions, suitable gear reduction ratios are employed between shafts 81 and 87. For example, if the test potentiometer 1 is intended to operate through only one revolution, while the standard 2 is of the 15 turn helical type, the ratio of the gear train between shaft 81 and shaft 87 should be approximately 15:1.

It is to be understood that additional chucks, such as 82 in Fig. 6, may be provided in the test instrument and be coupled to driven gear 84 in any desired ratio, and that as many such additional chuck positions and as many different gear ratios may be employed as there are different types of potentiometers to be tested. Alternatively, a continuously variable ratio drive mechanism may be employed in lieu of the fixed gear train illustrated in Fig. 6, and with such an arrangement the ratio of the drive mechanism will be set prior to each test to accord with any differences in shaft rotation between the test potentiometer 1 and the standard potentiometer 2.

Figure 1:
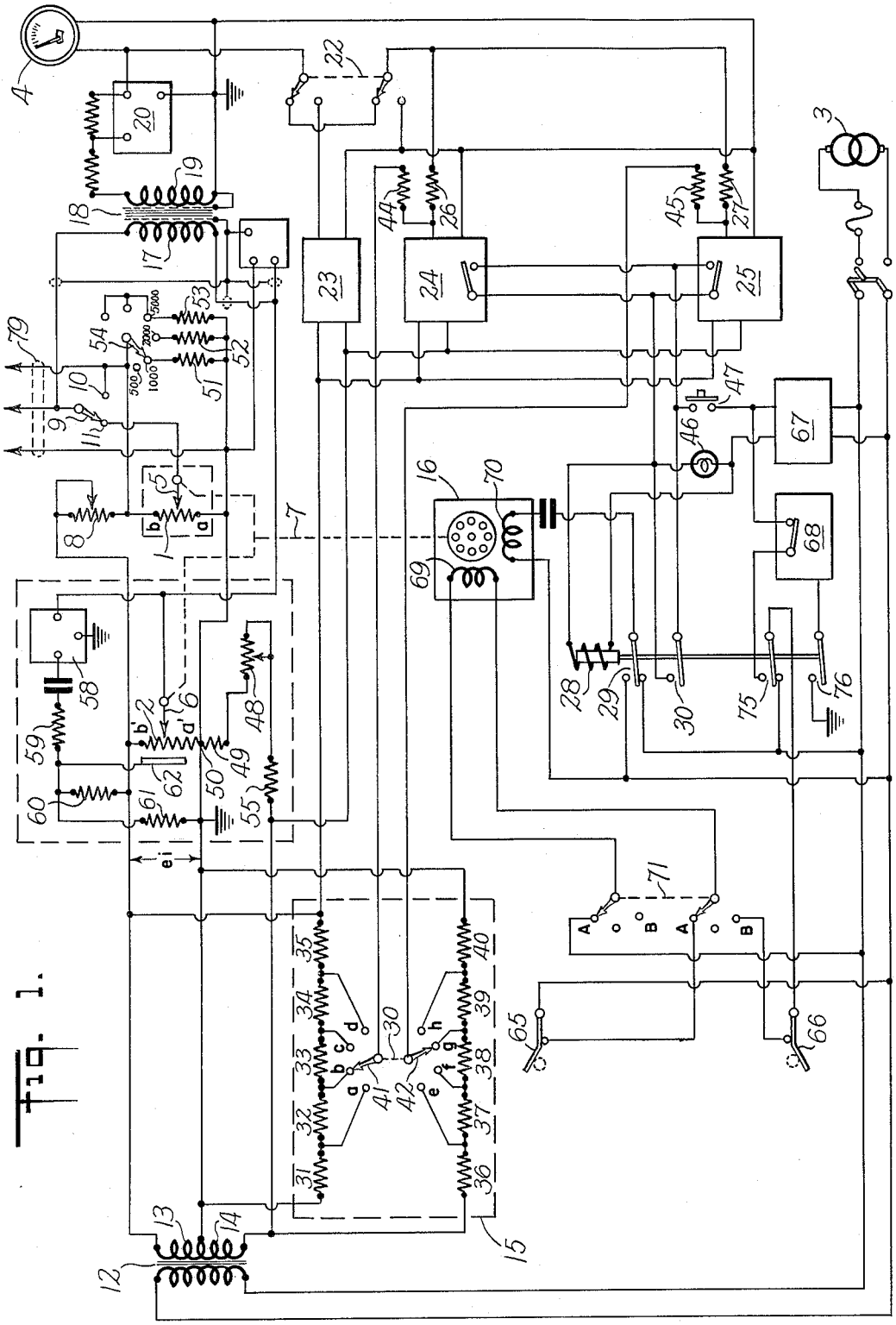
Fig. 1 represents a schematic diagram showing a preferred embodiment of my invention.

Reference is now had to Fig. 1 of the drawings which discloses a preferred embodiment of my invention in a complete automatic potentiometer test circuit. Here it will be seen that the test potentiometer 1 is connected in series with the variable resistor 8 and in parallel with the standard potentiometer 2, both are energized by potential from source 3 as transmitted through transformer 12, having a center tapped secondary winding 13—14. The upper half 13 of the secondary winding of transformer 12 supplies a common potential to the test and standard potentiometers 1 and 2 respectively, while the lower half 14 of the center tapped secondary of transformer 12 supplies a potential of like magnitude but opposite phase to the tolerance selector circuit indicated generally at 15. The wipers 5 and 6 of potentiometers 1 and 2 respectively are coupled through suitable ratio changing means (Fig. 6) to a common drive shaft 7 which is driven by reversible electric motor 16, deriving its power from the same line source 3.

Additional test positions for the testing of a plurality of types and sizes of potentiometers may be connected in parallel with the test potentiometer 1 by means of the connectors 79, and the shaft couplings for these additional potentiometer positions may be connected to the drive shaft 7 and motor 16 through appropriate gear trains (not shown) of different ratios to accommodate the different types of potentiometers which may be adapted to rotate through greater or lesser angles than the standard potentiometer against which they are compared.

One of the advantageous features of the invention is that any type or size of potentiometer, whether designed to rotate through an angle of less than 360° or to operate through more than one complete revolution, may be tested and compared against a single standard potentiometer, and it is not necessary that the standard of comparison be the same type of potentiometer structure as the potentiometer to be tested. A plurality of test positions may be provided with a separate chuck at each position adapted to receive a potentiometer shaft, and each chuck may be coupled to the drive shaft 7 through a separate gear train having a ratio suitable to accommodate a particular type of potentiometer to be tested. Alternatively, a continuously variable ratio or adjustable coupling may be employed between the drive shaft and a single test position chuck to facilitate the testing of various types of potentiometers.

The potentiometer wipers 5 and 6 in the preferred embodiment are connected to the primary 17 of a shielded and electrostatically balanced output transformer 18, the secondary 19 of which feeds the input circuit of a high-gain linear amplifier 20. The output of amplifier 20 is connected to the error indicating voltmeter 4. Details of the structure of the transformer 18 and its associated balancing circuit for the elimination of capacitive loading are disclosed in the copending application of James L. West and Monson H. Hayes, Serial Number 387,950, filed October 23, 1953.

The amplifier 20 is preferably a feed-back amplifier of the general type disclosed by Bode in his "Network Analysis and Feed-Back Amplifier Design" published by Van Nostrand in 1945, although any good quality high-gain amplifier may be employed at this position. An amplifier well suited for this purpose is disclosed in my copending application Serial Number 388,005, filed October 23, 1953.

Connected in parallel with the error indicating voltmeter 4, through the medium of double pole-double throw selector switch 22, are phase detectors 24 and 25. The output signal from amplifier 20 passes through selector switch 22, in the position illustrated in Fig. 1 of the drawings, and thence to phase detectors 24 and 25 through the summing resistors 26 and 27, respectively. If the selector switch 22 is moved to the opposite position from that shown in Fig. 1, the phase detectors 24 and 25 are disconnected from the circuit and a servo recorder 23 is connected to the output of amplifier 20 to make a graphic record of the error signal appearing on voltmeter 4.

The phase detectors 24 and 25 are essentially very sensitive phase responsive A. C. amplifiers the output of which controls the operation of a plate-sensitive relay. The position of these plate circuit relay armatures is determined by the phase of the A. C. input to phase detectors 24 and 25. A detailed schematic diagram of a phase detector suitable for this purpose is disclosed in the copending application of John M. Hunt, Serial Number 384,276, filed October 5, 1953, for an "Automatic Ratio Voltmeter."

These phase detectors 24 and 25 compare the amplified error signal, which corresponds to the potential difference between wipers 5 and 6 at any position to which they are advanced by motor 16, with a predetermined tolerance signal which is applied to each phase detector from the tolerance selector 15. As will be explained in greater detail hereinafter, the tolerance selector 15 may be adjusted to provide a reference potential corresponding to any desired degree of tolerance between the standard and the test potentiometers. If the error voltage at the phase detectors 24 and 25 exceeds either the positive or negative tolerance, relay 28 is energized and through the opening of normally closed contact 29 the operation of motor 16 is interrupted. Indicator lamp 46 is energized by closure of the normally open contact 30 on relay 28, to signal rejection of the potentiometer under test. If it is then desired to make a graphic record of the error, the selector switch 22 may be operated to connect the servo recorder 23 with the error signal from amplifier 20, and the circuit may be conditioned to repeat the test by operation of reset switch 47, as will be described more fully hereinafter.

It may be noted that if the operating galvanometer movements of the servo recorder 23 and the indicating voltmeter 4 are chosen to have full scale readings proportional to the exciting voltage $e_i$ from secondary winding 13 of transformer 12, the linearity measurement as indicated or recorded will be entirely independent of the actual magnitude of the excitation voltage.

Referring now to the tolerance selector circuit indicated generally at 15, it may be seen that a double contactor multi-position selector switch 30 controls two voltage divider circuits each of which is connected across one side of the secondary of transformer 12. Resistors 31, 32, 33, 34, and 35 are connected in series across the winding 13, which comprises the upper half of the secondary winding of transformer 12, with the junction points between these series resistors connected to upper contacts a, b, c and d of switch 30. In like manner, resistors 36, 37, 38, 39 and 40 are connected in series across the lower half of the secondary winding, 14, and the junction points between these series resistors are connected to contacts e, f, g and h of selector switch 30. Contactor arm 41 of switch 30, which is adapted to engage contacts a, b, c and d, is connected through summing resistor 44 to the positive responsive phase detector 24, while contactor 42 of switch 30, which is adapted to engage contacts e, f, g and h, is connected through summing resistor 45 to engage the negative responsive phase detector 25. Contactors 41 and 42 are mounted on a common shaft in such manner that when contactor 41 moves from a to b, contactor 42 moves from h to g. Consequently, in these voltage dividing networks, the resistor 31 has an identical resistance value to that of resistor 40, resistor 32 corresponds in value to resistor 39, resistor 33 corresponds to resistor 38, resistor 34 corresponds to resistor 37 and resistor 35 corresponds to resistor 36. In order to provide for the selection of tolerances of 0.1%, 0.2%, 0.5% and 1.0% by the movement of arm 41 on selector switch 30 from a to b to c to d respectively, the respective resistance values in these voltage divider networks may be as follows:

|    | Ohms  |
|----|-------|
| 31 | 100   |
| 32 | 100   |
| 33 | 300   |
| 34 | 510   |
| 35 | 9,100 |
| 36 | 9,100 |
| 37 | 510   |
| 38 | 300   |
| 39 | 100   |
| 40 | 100   |

All of these resistors should preferably be selected with a tolerance of plus or minus 1%.

Referring now in greater detail to the bridge circuit in which the test potentiometer 1 and the standard potentiometer 2 are connected in Fig. 1, it will be seen that a variable resistor 8 is provided in series with test potentiometer 1 for the purpose of adjusting the current flow through the test potentiometer to a value at which the potential on wiper arm 5 will exactly equal the potential on wiper arm 6 when the wiper shafts 5 and 6 are aligned at two calibration check points, corresponding to the points a and b in Fig. 5. The resistance of variable resistor 8 is preferably of a value much lower than the resistance of test potentiometer 1. In the preferred embodiment of the invention illustrated by Fig. 1, variable resistor 8 may have a resistance value of 50 ohms.

It will be noted that a plurality of fixed resistors 51, 52 and 53 are adapted to be connected in parallel shunt relation to the test potentiometer 1 by means of selector switch 54. The purpose of shunt resistors 51, 52 and 53 is to limit the total current flow through test potentiometer 1 in order that the preferred low value variable resistance 8 may be employed for calibration of a variety of test potentiometers having a wide range of total resistance values. Accordingly, the higher the resistance of the potentiometer to be tested, the lower should be the value of the shunt resistor selected. In the preferred embodiment illustrated by Fig. 1, the selector switch 54 is provided with six taps, the first of which, labeled "500," does not connect with any shunt resistance. If the overall resistance of test potentiometer 1 is only 500 ohms, the selector switch 54 is moved to the position marked "500" and no shunt is connected across the test potentiometer.

The impedance of the test potentiometer leg of the bridge circuit of Fig. 1 is maintained at approximately 500 ohms. Thus, if a potentiometer having an overall resistance of 1,000 ohms is to be tested, the selector switch 54 is moved to the "1,000" position as shown in Fig. 1 of the drawing, and resistor 51, having a value of 1,000 ohms, is connected in parallel with the test potentiometer 1 to maintain the bridge impedance at 500 ohms. Similarly, if the potentiometer to be tested has a value of 2,000 ohms, resistance selector switch 54 is advanced to the "2,000" position which connects resistor 52, having a value of 750 ohms in parallel with the test potentiometer 1. If the resistance of the potentiometer to be tested is 5,000 ohms or more, the selector switch 54 is advanced to connect resistor 53, having a resistance of 500 ohms, in shunt with the test potentiometer 1.

For the standard potentiometer 2, any good quality potentiometer having the desired linear characteristics may be employed. Preferably the resistance value of the standard potentiometer 2 should not be less than 10% of the resistance value of the highest resistance potentiometer to be tested, nor more than 10 times the resistance value of the lowest resistance potentiometer to be tested. Where it is most frequently desired to test potentiometers having resistance values of the order of 500 ohms to 20,000 ohms, I have found a 5,000 ohm potentiometer to be most useful as the standard, 2. Because of the greater range of adjustments afforded, and consequently the greater accuracy of calibration possible, I prefer to employ a 15 revolution, 5,000 ohm potentiometer for the standard 2. With this standard, other potentiometers capable of rotation through 5,400 degrees may be accurately tested, and also by means of selecting suitable gear ratios between the wiper shafts 5 and 6, other potentiometers adapted for rotation through smaller or larger angles may be more accurately tested.

A small variable resistor 48 will be seen connected between the grounded end of the standard potentiometer 2, and fixed resistor 55 which is connected to the high potential side of the secondary winding 14 of transformer 12. The purpose of the variable resistor 48 is to enable an operator to adjust the current flow through the lower end 49 of standard potentiometer 2 to exactly equal the current flow flowing through the upper and major portion of potentiometer 2, so that the grounded junction point 50 may be maintained exactly at zero potential.

It will be noted that the grounded junction 50 is not located exactly at the lower end of the resistance element of potentiometer 2. The reason for this is that, depending upon the type of potentiometer which may be selected for use as the standard 2, physical limits within the structure of the potentiometer may prevent the wiper arm 6 from ever engaging the extreme lower end of the resistance element. To overcome this physical limitation of the standard, I have found it desirable to tap the lower end of the resistance element at a point 50 which is located at approximately 10° angular displacement of the wiper arm 6 from its lowermost position on the potentiometer 2. If the resistance of the standard potentiometer 2 is 5,000 ohms, the variable resistor 48 may have a value of 250 ohms, and resistor 55 may have a value of 4,900 ohms.

To prevent capacitative loading of the standard potentiometer 2, and to prevent or reduce phase shift between the potential at the wiper arm 6 and the input potential $e_i$, I prefer to employ an anti-phase shift circuit comprising the cathode follower 58 and its associated summing resistors 59, 60 and 61 to drive a conductive body 62 in close proximity to the resistance element. Conductive body 62 may be the insulated mandrel on which the resistance wire of potentiometer 2 is wound, or it may be a metal casing in which the potentiometer resistance element is mounted. A detailed disclosure of this anti-phase shift circuit is given in the copending application of Monson H. Hayes and James L. West, Serial Number 387,950, filed October 23, 1953.

Although the coupled shafts 5 and 6 of the test and standard potentiometers 1 and 2, respectively, may be rotated by hand through the medium of a crank (not shown) connected to the common drive shaft 7, in the preferred embodiment of my invention, I provide an electric motor 16 and associated switching controls, as disclosed in the lower left hand portion of Fig. 1, to drive the potentiometer wipers at a uniform rate. Limit switches 65 and 66, coupled to the drive shaft 7, serve to interrupt the operation of reversible motor 16 at the upper and lower limits respectively of the potentiometer shaft rotation, to prevent damage to potentiometers 1 and 2. Also, in order to effect rapid deceleration and positive stopping of the motor 16, whenever the detected deviation of the test potentiometer from the standard exceeds the preselected tolerance, a D. C. power supply 67 is connected through a time delay relay 68 so as to apply a D. C. potential to the field coil 69 of motor 16 at the same time that the driving coil 70 is de-energized by the opening of contact 29 on relay 28. By this means, and by short circuiting coil 70 through operation of relay 28, dynamic braking is applied to the motor 16 whenever its operation is interrupted. This prevents the drive motor 16 from coasting, and stops the test potentiometer wiper arm 5 at the position of the detected fault.

The manner in which the various portions of the circuit illustrated by Fig. 1 cooperate may best be understood from a step-by-step description of the procedure followed in testing a potentiometer. First, the wiper arm 6 of the standard potentiometer 2 is rotated toward the end $a'$ of potentiometer 2 corresponding to the start position, or position of zero wiper travel as indicated on a calibrated dial (not shown). Switch 54 is then adjusted to the position corresponding to the resistance value of the potentiometer to be tested. In the specific illustration of Fig. 1, switch 54 is positioned to test a 1,000 ohm potentiometer. The potentiometer 1 to be tested is next inserted in the test position as indicated, and its wiper shaft 5 is rotated toward the lower end $a$ of its resistance element to a position where no voltage is indicated on the voltmeter 4. This establishes that both potentiometers 1 and 2 are now set at their positions of zero electrical travel.

The motor selector control switch 71 is next turned to the A position as shown in Fig. 1. The field coil 69 of motor 16 is now connected through switch 71 and through normally closed upper limit switch 65 to the power line. Driving coil 70 is connected through normally closed contact 29 of relay 28, and the motor 16 operates to rotate drive shaft 7 and coupled wiper shafts 5 and 6 to the upper ends $b$ and $b'$ of their electrical travel, for calibration of the upper check point corresponding to $b$ in Fig. 5. At this point, the motor 16 is turned off automatically through the opening of upper limit switch 65. Next, the operator adjusts variable resistor 8 to give a null reading on meter 4. This establishes the upper check point corresponding to $b$ in Fig. 5.

The operator may now advance the wiper arms 5 and 6 by means of a hand crank (not shown) slightly farther in the same direction until a sudden and substantial change in error signal is observed on indicating voltmeter 4. At this point, the operator records the reading of the dial (not shown) on the test potentiometer shaft, as representing the total angle of electrical rotation.

The operator next turns the rotation selector switch 71 to its opposite position B for a check of linearity, and the tolerance selector switch 30 is turned to the desired tolerance position. Motor 16 now reverses and drives the shaft 7 so as to move the wiper arms 5 and 6 from their uppermost positions $b$ and $b'$ to their lowermost or zero positions $a$ and $a'$, as represented schematically in Fig. 1, continuously checking the linearity in the process. During this period, deviations between the linearity of the test potentiometer 1 and the standard potentiometer 2 may be observed on the indicating voltmeter 4. Normally, the linearity check will be made with the recorder selector switch 22 turned to the position illustrated in Fig. 1 and the phase detectors 24 and 25 will be connected to the output of amplifier 20 and to the output of the tolerance selector 15. In the specific illustration of Fig. 1, a tolerance of 0.2% has been selected. Consequently, if the linearity of the test potentiometer 1 deviates from that of the standard potentiometer 2 by more than 0.2% in either direction, (i. e., either above or below the line XE of Fig. 2) one of the phase detectors 24 or 25 will be operated, depending upon whether the deviation is plus or minus the ideal curve as established by the standard potentiometer 2.

If the linearity deviation between the test potentiometer 1 and the standard potentiometer 2 exceeds the tolerance limit selected by switch 30, relay 28 operates to close its normally open contact 30 and the reject indicator 46 will light to signal the operator that the test potentiometer is unacceptable. With the operation of relay 28, the normally closed contact 29 is opened to de-energize the driving coil 70 of motor 16 while the normally open contact 29 is closed to short circuit winding 70 and thereby effect dynamic braking of motor 16. Simultaneously, the normally closed contact 75 of relay 28 opens to de-energize the field coil 69 of motor 16 and the normally open contact 75 of relay 28 closes to apply direct current from the power supply 67 through the time delay relay 68, and through the normally closed contact of limit switch 66, to the field coil 69 thereby quickly stopping rotation of motor 16. A short time thereafter, the time delay relay 68 opens its contacts to remove the D. C. potential from field coil 69.

The operator may now remove the rejected test potentiometer from the testing circuit and proceed to test another potentiometer in its place, or he may wish to make a graphic record of the tested potentiometer's characteristics to show the nature and degree of its deviation from the standard. Assuming that a record is to be made, the operator will turn rotation selector switch 71 to the A position causing the motor 16 to rotate the drive shaft 7 and the coupled potentiometer shafts to the position of 100% electrical travel as described above. The recorder selector switch 22 is then turned to the opposite position from that shown in Fig. 1, the switch 71 is again turned to the B position and the motor 16 commences to rotate the potentiometer shafts 5 and 6 toward their zero positions. The servo-recorder 23 now makes a graphic record of the linearity of the test potentiometer resistance throughout the entire length of wiper travel. As phase detectors 24 and 25 are normally disconnected when the recorder 23 is in use, there will be no interruption in travel of the potentiometer wiper arm 5 from its uppermost to its lowermost position, as illustrated schematically in Fig. 1, but this motion will continue until the motor 16 is interrupted by opening of the lower limit switch 66. It is to be understood, however, that if desired to make a graphic record of each potentiometer tested, the recorder selector switch 22 may be eliminated from the circuit and the recorder 23 may be permanently connected to the output of the amplifier 20, in parallel with the phase detectors 24 and 25. In this arrangement, the record will normally be interrupted whenever the linear deviation of the potentiometer under test exceeds the preselected tolerance limits.

Upon completion of each potentiometer test, as above described, the rejection indicator lamp 46 may be extinguished and relay 28 may be released to recondition the circuit for the next test by opening the normally closed reset switch 47. A spring loaded, normally closed push button may be employed for switch 47, as only a momentary open is necessary to release relay 28.

It is to be understood that in addition to the visual indicator reject lamp 46, or as an alternative thereto, other electrically operated means, as for example a magnetic chuck, may be employed to disengage the tested potentiometer and to automatically eject it from the tester.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. The method of comparing the electrical conformance of variable potential dividers of unknown linear characteristics with the linear characteristics of a known potential divider and determining deviations therefrom in excess of predetermined tolerance limits which comprises the steps of applying substantially identical potentials from a common source across the known and unknown dividers, tapping intermediate potentials of like magnitude from corresponding portions of both dividers, adjusting the currents flowing through each of said dividers to produce equal potentials of a different magnitude at another tapped position of each divider, selecting reference potentials of substantially opposite phase from said applied identical potentials and of a magnitude proportional to said predetermined tolerance limits, progressively changing corresponding taps of said potential dividers from one position to another, and summing the potentials between corresponding tap positions of both of said potential dividers with said selected reference potentials of substantially opposite phase to produce a rejection indicating potential whenever the sum of said oppositely phased potentials exceeds zero.

2. A potential divider linearity testing system comprising in combination a first potential divider having a resistance element of preselected linear characteristics, a movable contactor engageable with different portions of said resistance element, a shaft coupled to said movable contactor for moving said contactor into engagement with any selected portion of said resistance element, means for connecting the resistance element of a second potential divider in parallel circuit relation with the resistance element of said first potential divider, means for connecting a common source of potential to the resistance elements of both of said potential dividers, coupling means for connecting the shafts of both of said potential dividers to a common drive shaft whereby the movable contactors of said potential dividers may be simultaneously moved proportionally into engagement with corresponding portions of their respective resistance elements, potential responsive relay means, means for connecting the movable contactors of said potential dividers with said potential responsive relay means, means for selectively varying the sensitivity of said relay means to render said relay means operable by a potential of predetermined magnitude, and indicating means responsive to operation of said potential responsive relay means whenever the potential between the movable contactors of said potentiometers exceeds the value of said predetermined potential.

3. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, potential responsive relay means, means for connecting the wiper arms of said potentiometers with said potential responsive relay means, means for deriving a potential of preselected magnitude and opposite phase from said common source, summing network means connecting said potential of preselected magnitude with said potential responsive relay means and with said wiper arms, and indicating means responsive to operation of said potential responsive relay means whenever the potential between said wipers exceeds the value of said preselected potential.

4. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, a pair of oppositely phased potential responsive relays, means for connecting the wiper arms of said potentiometers with both of said potential responsive relays, means for deriving a first potential of preselected magnitude and opposite phase from said common source, means for deriving a second potential of corresponding magnitude and of like phase as said common source, summing networks connecting said first and second derived potentials with said first and second potential responsive relays and with said potentiometer wiper arm connecting means, and indicating means responsive to operation of either of said potential responsive relays whenever the potential between said wiper arm exceeds the value of said preselected potentials.

5. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, a pair of oppositely phased potential responsive relays, means for connecting the wiper arms of said potentiometers with both of said potential responsive relays, means for deriving a potential of preselected magnitude and opposite phase from said common source, means for deriving a potential of corresponding magnitude and of like phase as said common source, summing networks connecting said first and second derived potentials with said first and second potential responsive relays and with said potentiometer wiper arm connecting means, motor drive means coupled to said common drive shaft for imparting motion to said wiper shafts simultaneously, switching means for operating said motor in either direction, and further switching means responsive to operation of either of said potential responsive relays for interrupting the operation of said motor whenever the potential between said wiper arms exceeds the value of said preselected potentials.

6. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, a pair of oppositely phased potential responsive relays, means for connecting the wiper arms of said potentiometers with both of said potential responsive relays, means for deriving a potential of preselected magnitude and opposite phase from said common source, means for deriving a potential of corresponding magnitude and of like phase as said common source, summing networks connecting said first and second derived potentials with said first and second potential responsive relays and with said potentiometer wiper arm connecting means, reversible motor drive means coupled to said common drive shaft for imparting motion to said wiper shafts simultaneously, switching means for operating said motor in either direction, means limiting the rotation of said common drive shaft in either direction to interrupt the operation of said motor, further switching means operable in response to operation of either of said potential responsive relays to interrupt the operation of said motor whenever the potential between said wiper arms exceeds the value of said preselected potentials, and dynamic braking means operable by said further switching means to stop the rotation of said motor.

7. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, a visual indicator of potential, means connecting said indicator with the wiper arms of said potentiometers, a pair of oppositely phased potential responsive relays, means for connecting the wiper arms of said potentiometers with both of said potential responsive relays, means for deriving a first potential of preselected magnitude and opposite phase from said common source, means for deriving a second potential of corresponding magnitude and of like phase as said common source, summing networks connecting said first and second derived potentials with said first and second potential responsive relays and with said potentiometer wiper arm connecting means, and indicating means responsive to operation of either of said potential responsive relays whenever the potential between said wiper arms deviates from the value of said preselected potentials.

8. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, means for deriving a potential of preselected magnitude and opposite phase from said common source, means for deriving a potential of magnitude corresponding to said preselected potential and of phase corresponding to said common source, a pair of oppositely phased potential responsive relays, a graphic potential recorder, means for connecting the wiper arms of said potentiometers with both of said potential responsive relays and with said graphic recorder, means connecting said derived potentials of preselected magnitude with said recorder and said relays, and indicating means responsive to operation of either of said potential responsive relays whenever the potential between said wiper arms deviates from the value of said preselected potentials.

9. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, means for deriving a potential of preselected magnitude and opposite phase from said common source, means for deriving a potential of magnitude corresponding to said preselected potential and of phase corresponding to said common source, a pair of oppositely phased potential responsive relays, a graphic potential recorder, selective switching means for connecting the wiper arms of said potentiometers with either said graphic recorder or said potential responsive relays, means connecting said derived potentials of preselected magnitude with said recorder and said potential responsive relays, and indicating means connected with said potential responsive relays and operable thereby whenever the potential between said wiper arms deviates from the value of said preselected potentials.

10. A potentiometer linearity testing system comprising in combination a first potentiometer having a resistance element of preselected linear characteristics, a wiper arm engageable with different portions of said resistance element, a wiper shaft coupled to said wiper arm for moving said arm into engagement with any selected portion of said element, means for connecting the resistance element of a second potentiometer in parallel circuit relation with the resistance element of said first potentiometer, means for connecting a common source of potential to the resistance elements of both of said potentiometers, coupling means for connecting the wiper shafts of both of said potentiometers to a common drive shaft whereby the wiper arms of said potentiometers may be simultaneously moved proportionally into engagement with corresponding portions of their respective resistance elements, means for deriving a potential of preselected magnitude and opposite phase from said common source, means for deriving a potential of magnitude corresponding to said preselected potential and of phase corresponding to said common source, a pair of oppositely phased potential responsive relays, a graphic potential recorder, a visual potential indicator, an isolation circuit connecting the wiper arms of said potentiometers to said potential indicator, selective switching means connecting said graphic recorder or said potential responsive relays in parallel with said visual indicator, means connecting said derived potentials of predetermined magnitude with said recorder and said potential responsive relays, and reject means connected with said potential responsive relays and operable thereby whenever the potential between said wiper arms exceeds the value of said preselected potentials.

11. A potentiometer tester comprising in combination, a first potentiometer having a resistance element of predetermined linear characteristics, a movable contactor engageable with said resistance element, and a rotatable shaft coupled with said contactor for imparting motion thereto; means for removably coupling the rotatable shaft of a second potentiometer with the shaft of said first potentiometer, means for connecting the resistance element of said second potentiometer in parallel circuit relation with the resistance element of said first potentiometer, variable impedance means connected in shunt relation with said second potentiometer connecting means, means for connecting a common source of potential to the resistance elements of said potentiometers, means for connecting said coupled shafts of both potentiometers to a common drive shaft, reversible motor drive means coupled to said common drive shaft for imparting motion simultaneously to the contactors of both of said potentiometers, means for deriving potentials of preselected magnitude from said common source, at least one of said derived potentials of substantially opposite phase from said source, a pair of oppositely phased potential responsive relays, potential summing means connecting said derived potentials to both of said relays, amplifier means connecting the contactors of both of said potentiometers to said potential sunmming means whereby said potential responsive relays are responsive to the sum of potentials applied to said summing means, and means responsive to operation of either of said potential responsive relays to interrupt said motor drive means.

12. Means for testing the linear characteristics of variable potential dividers and for indicating the conformance thereof within preselected limits of tolerance to a predetermined norm comprising, means for connecting a potential divider of unknown linearity in parallel circuit relation with a potential divider of predetermined characteristics, means for applying substantially identical potentials from a common source across both of said potential dividers, means for tapping intermediate potentials of like magnitude from corresponding portions of both dividers, means for adjusting the currents flowing through each of said dividers to produce equal potentials of a different magnitude at another tapped position of each divider, means for deriving selected reference potentials of substantially opposite phase from said applied identical potentials and of a magnitude proportional to said preselected limits of tolerance, means for simultaneously changing corresponding taps of said potential dividers progressively from one position to another, and means for summing the potentials between corresponding tap positions of both of said potential dividers with said selected reference potentials of substantially opposite phase to produce a deviation indication whenever the sum of said oppositely phased potentials exceeds zero.

References Cited in the file of this patent
UNITED STATES PATENTS

| | | |
|---|---|---|
| 2,469,465 | Hamilton et al. | May 10, 1949 |
| 2,479,051 | Sunstein | Aug. 16, 1949 |
| 2,500,605 | Lange et al. | Mar. 14, 1950 |
| 2,509,017 | Sear | May 23, 1950 |